US011225583B2

(12) United States Patent
Li et al.

(10) Patent No.: US 11,225,583 B2
(45) Date of Patent: Jan. 18, 2022

(54) AQUEOUS POLYMER DISPERSION AND USE THEREOF AS INK ANCHORAGE PRIMER

(71) Applicant: BASF SE, Ludwigshafen am Rhein (DE)

(72) Inventors: Li Li, Shanghai (CN); Jian Feng Xia, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 202 days.

(21) Appl. No.: 16/337,645

(22) PCT Filed: Sep. 14, 2017

(86) PCT No.: PCT/EP2017/073139
§ 371 (c)(1),
(2) Date: Mar. 28, 2019

(87) PCT Pub. No.: WO2018/059954
PCT Pub. Date: Apr. 5, 2018

(65) Prior Publication Data
US 2020/0032094 A1 Jan. 30, 2020

(30) Foreign Application Priority Data
Sep. 29, 2016 (WO) ................ PCT/CN2016/100831

(51) Int. Cl.
*C09J 133/08* (2006.01)
*C09J 133/10* (2006.01)
*C09J 133/12* (2006.01)
*C08L 33/08* (2006.01)
*C08L 33/10* (2006.01)
*C08L 33/12* (2006.01)
*C09D 11/54* (2014.01)
*B41M 7/00* (2006.01)
*C08F 220/14* (2006.01)
*C08F 220/18* (2006.01)
*C09D 11/107* (2014.01)

(52) U.S. Cl.
CPC ............ *C09D 11/54* (2013.01); *B41M 7/0018* (2013.01); *C08F 220/14* (2013.01); *C08F 220/18* (2013.01); *C09D 11/107* (2013.01); *C08F 220/1811* (2020.02); *C08F 2800/20* (2013.01)

(58) Field of Classification Search
None
See application file for complete search history.

(56) References Cited

U.S. PATENT DOCUMENTS

| 4,269,749 | A | | 5/1981 | Marriott et al. | |
|---|---|---|---|---|---|
| 5,300,554 | A | * | 4/1994 | Kreil | ...................... C09J 131/02 524/547 |
| 2014/0088220 | A1 | * | 3/2014 | Havaux | .................. C09J 133/10 523/122 |
| 2016/0186000 | A1 | * | 6/2016 | Yang | .................... C09D 133/12 524/521 |

FOREIGN PATENT DOCUMENTS

| CN | 103614103 A | * | 3/2014 | ............ C09J 133/08 |
|---|---|---|---|---|
| EP | 1777241 A1 | * | 4/2007 | ............ C08F 263/02 |
| EP | 2354200 A1 | | 8/2011 | |
| JP | 2008031404 A | * | 2/2008 | ............ C08F 218/10 |
| WO | WO-9325588 A1 | * | 12/1993 | ................ C08F 8/32 |
| WO | 2006007978 A1 | | 1/2006 | |

OTHER PUBLICATIONS

Machine translation of JP-2008031404-A (no date).*
International Search Report and Written Opinion for International Application No. PCT/EP2017/073139, dated Nov. 7, 2017, 12 pages.
Walter Mächtle, "Charakterisierung von disperisionen durch gekoppelte H2O/D2O-ultrazentrifugenmessungen", Die Makromolekulare Chemie, vol. 185, Issue 5, May 1984, pp. 1025-1039. (Cited in specification—no English Translation available).

* cited by examiner

*Primary Examiner* — Michael J Feely
(74) *Attorney, Agent, or Firm* — Armstrong Teasdale LLC

(57) ABSTRACT

Provided herein is an aqueous polymer dispersion including A) a polymer synthesized from monomers including a) 1.0 to 90% by weight of at least one alkyl (meth)acrylate; b) 0.1 to 10% by weight of at least one ethylenically unsaturated acid or vinyl monomer with latent ionic groups; c) 0 to 5.0% by weight of at least one monoethylenically unsaturated monomer having at least one keto or aldehyde group; d) 1.0 to 90% by weight of at least one vinyl ester of saturated aliphatic monocarboxylic acid in which the carboxyl groups are attached to tertiary and/or quaternary carbon atoms; e) 0 to 20% by weight of at least one vinyl aromatics; and f) 0 to 20% by weight, based on the total amount of monomers for the synthesis of polymer A), of at least one hydroxyalkyl (meth)acrylate. Also included herein is an ink anchorage primer that enhances ink bonding.

15 Claims, No Drawings

AQUEOUS POLYMER DISPERSION AND USE THEREOF AS INK ANCHORAGE PRIMER

CROSS-REFERENCE TO RELATED APPLICATIONS

This application is the national stage entry of PCT/EP2017/073139, filed on Sep. 14, 2017, which claims the benefit of priority to International Patent Application No. PCT/CN2016/100831, filed Sep. 29, 2016, which are incorporated by reference in their entirety herein.

TECHNICAL FIELD

The present invention relates to an aqueous polymer dispersion and a method of preparing thereof. The present invention also relates to use of said aqueous polymer dispersion in the ink anchorage primer to enhance ink bonding to the substrate like polyethylene, polyethylene terephthalate, etc., especially biaxially oriented polypropylene.

BACKGROUND OF ART

Printing ink on a substrate surface is widely used on a variety of products including tobacco packages, cosmetic packages, commodity packages, food packages, bottle labels and the like. The substrate can be made out of various materials including polyethylene ("PE"), metallized PE, polyethylene terephthalate ("PET"), metallized PET, biaxially oriented polypropylene ("BOPP"), metallized BOPP, cast polypropylene ("CPP"), metalized paper and metalized paperboard, etc. When printing ink like UV curable ink directly on substrate surface, the adhesion of ink on substrate is very poor. Usually an ink anchorage primer is applied between the ink and the substrate to enhance the ink bonding to the substrate. The substrate could be metallized or non-metallized. Metallized substrate includes direct metallized or transfer metallized substrate to give label or package metal-like gloss and barrier property.

JP2008031404 discloses a water resistant aqueous binders for plastics, the binders comprise resin dispersion by emulsion polymerization of unsaturated monomers comprising 85.0-99.8% $R^1CR^2R^3CO_2CH=CH_2$ ($R^1,R^2,R^3$=alkyl; total carbon number in $R^1,R^2$ and $R^3$ is 7-9). It further indicates that the adhesive property is deteriorated substantially if the amount of $R^1CR^2R^3CO_2CH=CH_2$ is less than 85.0% and does not mention its adhesive of inks on substrate.

CN 103614103A discloses a soap-free modified acrylic emulsion adhesive, which comprise soft acrylate monomer, hard monomer like styrene, acrylonitrile, vinyl acetate, vinyl chloride and/or Veova-10 and functional monomer to improve the water resistance as well as acid and alkali resistance of water borne adhesive. However, it only describes the effect of using co-polymerizable emulsifier and does not mention its adhesive of inks on substrate.

The ink anchorage primer used in the prior art comprising styrene-acrylate copolymer emulsion is adhesive to some of metallized PE in the market; however, it is not adhesive to other substrate like BOPP, etc. Therefore, there is a need for an ink anchorage primer applied to enhance the ink bonding to substrate, especially on BOPP, etc.

INVENTION SUMMARY

The object of the present invention is to provide an aqueous polymer dispersion, which can be used in ink anchorage primer to enhance the ink bonding to substrate.

Thus, the present invention is directed to an aqueous polymer dispersion comprising:

A) a polymer synthesized from monomers comprising,
  a) 1.0 to 90% by weight, based on the total amount of monomers for the synthesis of polymer A), of at least one alkyl (meth)acrylate;
  b) 0.1 to 10% by weight, based on the total amount of monomers for the synthesis of polymer A), of at least one ethylenically unsaturated acid or vinyl monomer with latent ionic groups;
  c) 0 to 5.0% by weight, based on the total amount of monomers for the synthesis of polymer A), of at least one monoethylenically unsaturated monomer having at least one keto or aldehyde group;
  d) 1.0 to 90% by weight, based on the total amount of monomers for the synthesis of polymer A), of at least one vinyl ester of saturated aliphatic monocarboxylic acid in which the carboxyl groups are attached to tertiary and/or quaternary carbon atoms;
  e) 0 to 20% by weight, based on the total amount of monomers for the synthesis of polymer A), of at least one vinyl aromatics;
  f) 0 to 20% by weight, based on the total amount of monomers for the synthesis of polymer A), of at least one hydroxyalkyl (meth)acrylate, and B) optional at least one compound which comprises at least two functional groups reactive to the keto or aldehyde group.

The present invention also relates to a process for the preparation of said aqueous polymer dispersion.

The present invention also provides an ink anchorage primer comprising said aqueous polymer dispersion which enhance ink bonding to the substrate like PE, PET, etc., especially BOPP.

The present invention also includes the use of said ink anchorage primer for labels and package materials.

Further, enclosed within the scope of the invention is also polymer A) as defined of the aqueous polymer dispersion as defined further below.

DETAILED DESCRIPTION OF THE INVENTION

In one aspect, the present invention provides an aqueous polymer dispersion comprising:

A) a polymer synthesized from monomers comprising,
  a) 1.0 to 90% by weight, based on the total amount of monomers for the synthesis of polymer A), of at least one alkyl (meth)acrylate;
  b) 0.1 to 10% by weight, based on the total amount of monomers for the synthesis of polymer A), of at least one ethylenically unsaturated acid or vinyl monomer with latent ionic groups;
  c) 0 to 5.0% by weight, based on the total amount of monomers for the synthesis of polymer A), of at least one monoethylenically unsaturated monomer having at least one keto or aldehyde group;
  d) 1.0 to 90% by weight, based on the total amount of monomers for the synthesis of polymer A), of at least one vinyl ester of saturated aliphatic monocarboxylic acid in which the carboxyl groups are attached to tertiary and/or quaternary carbon atoms;
  e) 0 to 20% by weight, based on the total amount of monomers for the synthesis of polymer A), of at least one vinyl aromatics;

f) 0 to 20% by weight, based on the total amount of monomers for the synthesis of polymer A), of at least one hydroxyalkyl (meth)acrylate, and B) optional at least one compound which comprises at least two functional groups reactive to the keto or aldehyde group.

wherein the Tg of polymer A) is from −20 to 30° C.

Another object of the present invention to provide a process for preparing the aqueous polymer dispersion of the invention, comprising the steps of:

1) free-radically polymerizing:
a) at least one alkyl (meth)acrylate;
b) at least one ethylenically unsaturated acid or vinyl monomer with latent ionic groups;
c) optional at least one monoethylenically unsaturated monomer having at least one keto or aldehyde group;
d) at least one vinyl ester of saturated aliphatic monocarboxylic acid in which the carboxyl groups are attached to tertiary and/or quaternary carbon atoms;
e) optional vinyl aromatics;
f) optional hydroxyalkyl (meth)acrylate, in the presence of at least one initiator and at least one emulsifier, then
2) optionally mixing the polymer obtained in step 1) with at least one compound which comprises at least two functional groups reactive to the keto or aldehyde group.

In addition, the present invention also provides an ink anchorage primer to enhance the ink bonding to substrate comprising:

1) 40 to 95% said aqueous polymer dispersion;
2) 0.1 to 5% wetting agent;
3) 0 to 10% coalescent agent;
4) 0 to 5% defoamer; and
5) 1.0 to 59% water.

The present invention also provides a film comprising said ink anchorage primer which could be used as labels, package and the like. Said film comprises a substrate like BOPP, CPP, PE, PET, metallized PET, metallized BOPP, metallized paper, metalized paperboard; an ink anchorage primer layer; and an ink layer.

The present invention provides an aqueous polymer dispersion comprising:
A) a polymer synthesized from monomers comprising,
a) 10 to 80% by weight, based on the total amount of monomers for the synthesis of polymer A), of at least one alkyl (meth)acrylate;
b) 1.0 to 5.0% by weight, based on the total amount of monomers for the synthesis of polymer A), of at least one ethylenically unsaturated acid or vinyl monomer with latent ionic groups;
c) 0.5 to 5.0% by weight, based on the total amount of monomers for the synthesis of polymer A), of at least one monoethylenically unsaturated monomer having at least one keto or aldehyde group;
d) 10 to 90% by weight, based on the total amount of monomers for the synthesis of polymer A), of at least one vinyl ester of saturated aliphatic monocarboxylic acid in which the carboxyl groups are attached to tertiary and/or quaternary carbon atoms;
e) 0 to 20% by weight, based on the total amount of monomers for the synthesis of polymer A), of at least one vinyl aromatics;
f) 0 to 20% by weight, based on the total amount of monomers for the synthesis of polymer A), of at least one hydroxyalkyl (meth)acrylate, and
B) at least one compound which comprises at least two functional groups reactive to the keto or aldehyde group.

wherein the Tg of polymer A) is from −15 to 20° C.

Preferably, the aqueous polymer dispersion comprises:
A) a polymer synthesized from
a) 10 to 70% by weight, based on the total amount of monomers for the synthesis of polymer A), of at least one alkyl (meth)acrylate;
b) 1.0 to 5.0% by weight, based on the total amount of monomers for the synthesis of polymer A), of at least one ethylenically unsaturated acid or vinyl monomer with latent ionic groups;
c) 1.0 to 5.0% by weight, based on the total amount of monomers for the synthesis of polymer A), of at least one monoethylenically unsaturated monomer having at least one keto or aldehyde group;
d) 20 to 84% by weight, based on the total amount of monomers for the synthesis of polymer A), of at least one vinyl ester of saturated aliphatic monocarboxylic acid in which the carboxyl groups are attached to tertiary and/or quaternary carbon atoms;
e) 0 to 20% by weight, based on the total amount of monomers for the synthesis of polymer A), of at least one vinyl aromatics;
f) 0 to 20% by weight, based on the total amount of monomers for the synthesis of polymer A), of at least one hydroxyalkyl (meth)acrylate, and
B) at least one compound which comprises at least two functional groups reactive to the keto or aldehyde group.

wherein the Tg of polymer A) is from −15 to 15° C.

More preferably, the aqueous polymer dispersion comprises:
A) a polymer synthesized from
a) 10 to 40% by weight, based on the total amount of monomers for the synthesis of polymer A), of at least one alkyl (meth)acrylate;
b) 1.0 to 3.0% by weight, based on the total amount of monomers for the synthesis of polymer A), of at least one ethylenically unsaturated acid or vinyl monomer with latent ionic groups;
c) 1.0 to 3.0% by weight, based on the total amount of monomers for the synthesis of polymer A), of at least one monoethylenically unsaturated monomer having at least one keto or aldehyde group;
d) 50 to 84% by weight, based on the total amount of monomers for the synthesis of polymer A), of at least one vinyl ester of saturated aliphatic monocarboxylic acid in which the carboxyl groups are attached to tertiary and/or quaternary carbon atoms;
e) 0 to 20% by weight, based on the total amount of monomers for the synthesis of polymer A), of at least one vinyl aromatics;
f) 0 to 20% by weight, based on the total amount of monomers for the synthesis of polymer A), of at least one hydroxyalkyl (meth)acrylate, and
B) at least one compound which comprises at least two functional groups reactive to the keto or aldehyde group.

wherein the Tg of polymer A) is from −13 to 10° C.

Expressions "a", "an", "the", when used to define a term, include both the plural and singular forms of the term.

The designation (meth)acrylate and similar designations are used herein as an abbreviated notation for "acrylate and/or methacrylate".

All percentages and ratios are mentioned by weight unless otherwise indicated.

The term "polymer", as used herein, includes both homopolymers, that is, polymers prepared from a single reactive compound, and copolymers, that is, polymers prepared by reaction of at least two polymer forming reactive, monomeric compounds.

The above alkyl (meth)acrylate monomer a) can be selected from $C_1$ to $C_{20}$ alkyl (meth)acrylate, preferably $C_1$ to $C_{10}$ alkyl (meth)acrylate, more preferably $C_1$ to $C_6$ alkyl (meth)acrylate, most preferably $C_1$ to $C_4$ alkyl (meth)acrylate. Examples of monomers of $C_1$ to $C_{10}$ alkyl (meth) acrylate include methyl acrylate, ethyl acrylate, isopropyl acrylate, n-propyl acrylate, n-butyl acrylate, isobutyl acrylate, tert-butyl acrylate, sec-butyl acrylate, pentyl acrylate, n-hexyl acrylate, octyl acrylate, 2-ethylhexyl acrylate, decyl acrylate, methyl methacrylate, ethyl methacrylate, isopropyl methacrylate, n-propyl methacrylate, n-butyl methacrylate, isobutyl methacrylate, tert-butyl methacrylate, sec-butyl methacrylate, pentyl methacrylate, n-hexyl methacrylate, octyl methacrylate, 2-ethylhexyl methacrylate, decyl methacrylate and mixtures thereof.

The amount of alkyl (meth)acrylate monomer can be 10 to 80% by weight, preferably 10 to 70% by weight, more preferably 10 to 40% by weight, based on the total amount of monomers for the synthesis of polymer A).

The above ethylenically unsaturated acid or vinyl monomer with latent ionic groups monomer b) can be a sulfonic acid, phosphoric acid or, preferably, carboxylic acid. In one preferred embodiment, the ethylenically unsaturated acid contains 10 carbon atoms or less, preferably 3 to 6 carbon atoms. Optionally the ionic groups may also be latent, as in maleic anhydride, for example, where the acid functionality is present in the form of an anhydride group. Suitable examples of the ethylenically unsaturated acid include (meth)acrylic acid, maleic acid, fumaric acid and itaconic acid, preferably, acrylic and/or methacrylic acid and mixtures thereof.

The amount of ethylenically unsaturated acid or vinyl monomer with latent ionic groups can be 0.1 to 10% by weight, preferably 1.0 to 5.0% by weight, most preferably 1.0 to 3.0% by weight based on the total amount of monomers for the synthesis of polymer A).

The monoethylenically unsaturated monomer c) having at least one keto or aldehyde group could be acrolein, methacrolein, vinyl alkyl ketones having 1 to 20 carbon atoms, preferably 1 to 10 carbon atoms in alkyl radical, examples of monomer c) are 2-ureido(meth)acrylate, 2-(2-oxoimidazolidin-1-yl)ethyl (meth)acrylate, N-[2-(2-oxooxazolidin-3-yl)ethyl] (meth)acrylate, formyl styrene, acetoacetoxybutyl methacrylate, 2-(acetoacetoxy)ethyl methacrylate, and diacetone methacrylamide or mixtures thereof, preferably acetoacetyl (meth)acrylate, acetoacetoxyethyl (meth)acrylate, and more preferably diacetone acrylamide.

In one preferred embodiment, the amount of monomer c) is 0 to 5.0% by weight, preferably 0.5 to 5.0% by weight, more preferably 1.0 to 5.0% by weight, most preferably 1.0 to 3.0% by weight based on the total amount of monomers for the synthesis of polymer A).

Vinyl ester of saturated aliphatic monocarboxylic acid in which the carboxyl groups are attached to tertiary and/or quaternary carbon atoms of monomer d) are compounds $R^1CR^2R^3CO_2CH=CH_2$, wherein $R^1$, $R^2$, $R^3$ are independently alkyl and total carbon number in $R^1$, $R^2$ and $R^3$ is 7 to 9. Examples of monomer d) includes vinyl neononanoate (Veova-9), vinyl neodecanoate (Veova-10) or mixtures thereof, more preferably Veova-10.

In one preferred embodiment, the amount of monomer d) is 5 to 90% by weight, preferably 10 to 90% by weight, more preferably 20 to 84% by weight, most preferably 50 to 84% by weight based on the total amount of monomers for the synthesis of polymer A).

In one preferred embodiment, monomers a) are selected from $C_1$ to $C_6$ alkyl (meth)acrylate, monomers b) are acrylic acid and/or methacrylic acid, monomers c) are diacetone acrylamide, and monomers d) are vinyl neodecanoate.

Examples of monomers of vinyl aromatic compounds of monomer e) include vinyltoluene, for example, α-methylstyrene, β-methylstyrene, α-butylstyrene, 4-n-butylstyrene, 4-n-decylstyrene, and preferably, styrene or mixtures thereof.

Examples of monomers of hydroxyalkyl (meth)acrylate of monomer f) are 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate or mixtures thereof.

In one preferred embodiment, polymer A) is synthesized in a single step reaction.

In one preferred embodiment, polymer A) is prepared by emulsion polymerization, and is therefore an emulsion polymer.

In the case of emulsion polymerization, ionic and/or non-ionic emulsifiers and/or protective colloids and/or stabilizers are use as surface-active compounds.

Suitable emulsifiers include anionic, cationic, and non-ionic emulsifiers. As interface-active substances it is preferred to use emulsifiers, whose relative molecular weights are typically below those of protective colloids. More particularly it has been found appropriate to use exclusively anionic emulsifiers, or a combination of at least one anionic emulsifier and at least one nonionic emulsifier. Useful nonionic emulsifiers are araliphatic or aliphatic nonionic emulsifiers, examples being ethoxylated mono-, di-, and tri-alkylphenols (EO degree: 3 to 50, alkyl radical: $C_4$-$C_{10}$), ethoxylates of long-chain alcohols (EO degree: 3 to 100, alkyl radical: $C_8$-$C_{36}$), and polyethylene oxide, polypropylene oxide homopolymers and copolymers. These polymers may comprise the copolymerized alkylene oxide units in random distribution or in the form of blocks.

EO/PO block copolymers, for example, are very suitable. Preference is given to ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also to ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_8$), of alkylsulfonic acids (alkyl radical: $C_{12}$-$C_{18}$) and of alkylarylsulfonic acids (alkyl radical: $C_9$-$C_{18}$). Other Suitable anionic emulsifiers are likewise bis(phenylsulfonic acid) ethers and their alkali metal salts or ammonium salts which carry a $C_4$-$C_{24}$ alkyl group on one or both aromatic rings. These compounds are common knowledge, from U.S. Pat. No. 4,269,749, and are available commercially, for example Dowfax® 2A1 from Dow.

Suitable cationic emulsifiers are preferably quaternary ammonium halides, examples being trimethylcetylammonium chloride, methyltrioctylammonium chloride, benzyltriethylammonium chloride or quaternary compounds of N—$C_6$-$C_{20}$-alkyl-pyridines, -morpholines or -imidazoles, e.g. N-laurylpyridinium chloride.

Examples of emulsifier are Calfax® DB 45 from Pilot Chemical, Dextrol®OC 50 from Ashland, Emulan® NP 50, Texapon® NSO, Lumiten® I-RA, Lumiten® E 3065, Disponil® FES 27, Disponil® FES 77, Disponil® BES 20, Disponil® LDBS, Disponil® SDS, Lutensol® AT 18, and Hydropalat® 885 from BASF or mixtures thereof.

For the present invention, ionic emulsifiers or protective colloids are preferred. Particular preference are ionic emulsifiers, especially salts and acids, such as carboxylic acids, sulfonic acids and sulfates, sulfonates or carboxylates. More particular preference is given to fatty alcohol ether sulfates and to sulfosuccinic esters, and most particular preference is given to mixtures thereof.

The surface-active substance is commonly used in amounts of 0.1 to 10 parts by weight, preferably 0.2 to 5 parts by weight, per 100 parts by weight of the monomers to be polymerized.

Water-soluble initiators for the emulsion polymerization are, for example, ammonium salts and alkali metal salts of peroxodisulfuric acid, e.g., sodium peroxodisulfate, hydrogen peroxide, or organic peroxides, e.g., tert-butyl hydroperoxide.

Also suitable are reduction-oxidation (redox) initiator systems.

The redox initiator systems are composed of at least one, usually inorganic reducing agent and one organic or inorganic oxidizing agent.

The oxidizing component comprises, for example, the emulsion polymerization initiators already mentioned above.

The reducing component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used together with soluble metal compounds whose metallic component may exist in a plurality of valence states.

Examples of customary redox initiator systems include ascorbic acid, iron(II) sulfate, sodium peroxodisulfate, tert-butyl hydroperoxide, sodium disulfite, and tert-butyl hydroperoxide, sodium hydroxymethanesulfinate. The individual components, the reducing component for example, may also be mixtures: for example, a mixture of the sodium salt of hydroxymethanesulfinic acid with sodium disulfite.

These compounds are mostly used in the form of aqueous solutions, the lower concentration being determined by the amount of water that is acceptable in the dispersion and the upper concentration by the solubility of the respective compound in water. The concentration of the aqueous solution is generally from 0.1 to 30% by weight, preferably from 0.5 to 20% by weight, with particular preference from 1.0 to 10% by weight, based on the solution.

The amount of the initiators is generally from 0.1 to 10% by weight, preferably from 0.5 to 5% by weight, based on the monomers to be polymerized. It is also possible for two or more different initiators to be used for the emulsion polymerization.

The emulsion polymerization takes place in general at from 30 to 130° C., preferably from 50 to 95° C. The polymerization medium may be composed either of water alone or of mixtures of water and water-miscible liquids such as methanol. Preferably, only water is used.

The emulsion polymerization may be conducted either as a batch operation or in the form of a feed process, including staged or gradient procedures. Preference is given to the feed process in which a portion of the polymerization mixture is introduced as an initial charge and heated to the polymerization temperature, the polymerization of this initial charge is begun, and then the remainder of the polymerization mixture is supplied to the polymerization zone, usually by way of two or more spatially separate feed streams, of which one or more comprise the monomers in straight or emulsified form, this addition being made continuously, in stages or under a concentration gradient, and polymerization being maintained during said addition.

The average particle size of the polymer particles dispersed in the aqueous dispersion is preferably smaller than 300 nm, in particular smaller than 200 nm. With particular preference the average particle size is situated between 50 and 200 nm.

By average particle size here is meant the d50 value of the particle size distribution, i.e., 50% by weight of the total mass of all particles have a smaller particle diameter than the $d_{50}$ value. The particle size distribution can be determined conventionally using the analytical ultracentrifuge (W. Mächtle, Makromolekulare Chemie 185 (1984), pages 1025-1039).

It is also possible, in order, for example, to set the particle size more effectively, to include a polymer seed in the initial charge to the polymerization.

The manner in which the initiator is added to the polymerization vessel in the course of the free-radical aqueous emulsion polymerization is known to the skilled person in this area. It may either be included in its entirety in the initial charge to the polymerization vessel or else introduced, continuously or in stages, at the rate at which it is consumed in the course of the free-radical aqueous emulsion polymerization. In each specific case this will depend both on the chemical nature of the initiator system and on the polymerization temperature. It is preferred to include one portion in the initial charge and to supply the remainder to the polymerization zone at the rate at which it is consumed.

In order to reduce the residual monomers, it is common to add initiator after the end of the actual emulsion polymerization as well, i.e., after a monomer conversion of at least 95%.

With the feed process, the individual components can be added to the reactor from the top, through the side, or from below, through the reactor floor.

In the case of emulsion polymerization, aqueous polymer dispersions with solid content of generally from 15 to 75% by weight, preferably from 40 to 75% by weight, most preferably from 40 to 50% by weight are obtained.

The polymer thus prepared is used preferably in the form of its aqueous dispersion.

The pH of the polymer dispersion is preferably adjusted to a pH of more than 4.5, and in particular to a pH of between 5 and 9.

The glass transition temperature (Tg) of the polymer is preferably from −15 to 20° C., more preferably from −15 to 15° C., and most preferably from −13 to 10° C.

One embodiment of the present invention relates to the polymer A) as defined above.

Aqueous polymer dispersion further comprises the compound B) defined above.

Compound B) has greater than 2 functional groups, in particular 2 to 5 functional groups, more preferably 2 or 3 functional groups, very preferably 2 functional groups reactive to the keto or aldehyde group.

Preferably, compound B) has 2 or 3 functional groups selected from hydrazide, hydroxylamine, oxime ether or amino groups. More preferably, compound B) has 2 or 3 functional groups of hydrazide.

Suitable compounds having hydrazide groups are, for example, polycarboxylic hydrazides having a molar weight of up to 500 g/mol, particularly preferred hydrazide compounds are dicarboxylic dihydrazides having preferably 2 to 10 carbon atoms.

Examples of suitable compounds containing dihydrazide are oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide or mixture thereof. Particular preference are adipic dihydrazide, sebacic dihydrazide, and isophthalic dihydrazide, most preferably are adipoyl dihydrazide. Suitable compounds containing hydroxylamine groups or oxime ether groups are specified for example in WO 9325588.

Examples of suitable compounds containing amino groups include ethylenediamine, propylenediamine, tetramethylenediamine, pentamethylenediamine, hexamethylenediamine, diethylenetriamine, triethylenetetramine, polyethyleneimines, partly hydrolyzed polyvinylformamides, cyclohexanediamine, and xylylenediamine or mixture thereof.

The compound B) may be added to the polymer A) or to the dispersion of the polymer at any point in time. In the aqueous dispersion there is as yet no crosslinking with the keto or aldehyde groups. Only in the course of drying does crosslinking occur on the coated substrate.

The amount of the compound B) is preferably such that the molar ratio of the functional groups of the compound B) to the keto and/or aldehyde groups of the polymer is 1:10 to 10:1, in particular 1:5 to 5:1, more preferably 1:2 to 2:1, and most preferably 1:1.5 to 1.5:1.

The weight fraction of compound B) is preferably 0.5 to 5, more preferably 0.5 to 3, most preferably 1 to 2 parts by weight per 100 parts by weight of polymer A).

Polymer A), or the aqueous dispersion of the polymer, can be mixed in a simple way with compound B). The resulting mixture is stable on storage.

A further embodiment of the invention relates to a process for the preparation of aqueous polymer dispersion of the present invention, which comprises:
1) free-radically polymerizing:
   a) at least one alkyl (meth)acrylate;
   b) at least one ethylenically unsaturated acid or vinyl monomer with latent ionic groups;
   c) at least one monoethylenically unsaturated monomer having at least one keto or aldehyde group;
   d) at least one vinyl ester of saturated aliphatic monocarboxylic acid in which the carboxyl groups are attached to tertiary and/or quaternary carbon atoms;
   e) optional vinyl aromatics;
   f) optional hydroxyalkyl (meth)acrylate, in the presence of at least one initiator and at least one emulsifier, then
2) mixing the polymer obtained in step 1) with at least one compound which comprises at least two functional groups reactive to the keto or aldehyde group.

In one preferred embodiment, polymer A) is prepared by emulsion polymerization as described above.

In a further preferred embodiment, step 1) is carried out in a single step reaction.

The polymer obtained in step 1) can be neutralized with a neutralizing agent before mixing with compound B). The neutralizing agent can be selected from hydroxide of alkali metal, for example, sodium hydroxide and potassium hydroxide, and ammonia or mixture thereof.

A further embodiment of the invention relates to an ink anchorage primer to enhance the ink bonding to the substrate, especially on BOPP, which comprising:
a) 40 to 95% said aqueous polymer dispersion;
b) 0.1 to 5% wetting agent;
c) 0 to 10% coalescent agent;
d) 0 to 5% defoamer;
e) 1.0 to 59% water;
wherein the solid content of this ink anchorage primer is around 20 to 45w.t. %.

Examples of wetting agent are sulfocarbon acid ester sodium salt, polyether modified Polydimethylsiloxane ("PDMS"), alkyl modified PDMS, polyacrylate, F-modified polyacrylate or mixture thereof, like Hydropalat® WE 3475, Hydropalat® WE 3485, Hydropalat® WE 3650, Hydropalat® WE 3370 from BASF, etc.

Examples of coalescent agent are alcohol like benzyl alcohol, alcohol ester like texanol, alcohol ether like carbitol, alcohol ether ester like propylene glycol monomethyl ether acetate or mixture thereof.

Examples of defoamer agent are mineral oil, white oil, natural oil, polydimethylsiloxanes, etc, like FoamStar® SI 2292, FoamStar® SI 2213 from BASF or mixture thereof.

A further embodiment of the invention relates to use of the ink anchorage primer of present invention for labels, package materials of cigarette, liquor, food, and cosmetic.

A further embodiment of the invention relates to a film which comprises a substrate, an ink anchorage primer layer, and an ink layer. The film according to the present invention can be obtained by the following steps:
1) applying an ink anchorage primer according to the present invention onto the surface of a substrate (for example BOPP);
2) applying an ink on the top of the surface of ink anchorage primer layer.

The ink anchorage primer may be applied to the substrate by K-bar coater. Application is generally followed by a drying step for removing the volatilize parts, dry deposit of this ink anchorage primer on the substrate is around 0.1-4 g/m$^2$.

Examples of the inks are, digital printing ink, solvent based gravure ink and/or UV curable ink like Toka 161 and VP series, etc.

EXAMPLES

Raw material
Vinyl neodecanoate (VeoVa-10), polymer grade
Methyl methacrylate(MMA), polymer grade
Methacrylic acid(MAA), polymer grade
Butyl acrylate(BA), polymer grade
2-ethylhexyl acrylate(EHA), polymer grade
Diacetone acrylamide (DAAM), polymer grade
Di(propylene glycol) methyl ether, polymer grade Example 1

In a 2000 ml 4-necked flask equipped with a stirrer, a nitrogen inlet/outlet, a condenser and feeding ports, 471.2 g deionized water and 8.3 g Disponil® LDBS (Sodium dodecylbenzenesulfonate, 23 w.t. %) from BASF as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 24.5 g MMA, 10 g EHA, 8.6 g BA, 3 g DAAM and 51.5 g Veova-10 were added into the flask together in 150 minutes. Then add 6 g ammonia (20 w.t. %)

below 50° C., then add 64.2 g aqueous adipoyl dihydrazide solution (10 w.t. %) below 40° C., after the end of the feed the reaction mixture was cooled to room temperature. Tg of the obtained polymer is 0° C.

Formulate 56.8 g of the resulting latex with 40.2 g of demineralized water, 2.0 g Di(propylene glycol) methyl ether, 0.5 g Hydropalat® WE 3475 (di-2-ethylhexyl sulphosuccinate, sodium salt) from BASF, 0.5 g Foam Star® SI 2292 (solution of modified poly-dimethyl siloxane) from BASF and the respective ink anchorage primer is obtained.

Example 2

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 24.9 g MMA, 10.2 g EHA, 8.7 g BA, 1.5 g DAAM and 52.3 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is −8° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 3

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 37.6 g MMA, 28.4 g EHA, 8.6 g BA, 3 g DAAM and 20 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is 0° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 4

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 40.6 g MMA, 34 g EHA, 8.4 g BA, 3 g DAAM and 11.6 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is 3° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 5

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 36.1 g MMA, 7 g EHA, 3 g DAAM and 51.5 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is 10° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 6

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 31.3 g MMA, 10 g EHA, 1.8 g BA, 3 g DAAM and 51.5 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is 4° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 7

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 7.1 g MMA, 3 g DAAM, 7.5 g BA and 80 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is −12.5° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 8

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 15.3 g MMA, 10 g EHA, 17.8 g BA, 3 g DAAM and 51.5 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is −5° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 9

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 27.5 g MMA, 10 g EHA, 8.6 g BA and 51.5 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is −3° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 10

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 41.1 g MMA, 2 g EHA, 3 g DAAM and 51.5 g Veova-10 were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is 29° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Example 11

In a 2000 ml 4-necked flask equipped with a stirrer, a nitrogen inlet/outlet, a condenser and feeding ports, 471.2 g deionized water and 8.3 g Disponil® LDBS (23 w.t. %) as an initial charge was added. Then the reactor was heated to 85° C., and 15.4 g aqueous sodium persulfate aqueous solution (10 w.t. %) was added into the flask in 150 minutes. A monomer mixture of 2.4 g MAA, 45.9 g MMA, 10 g EHA, 3 g DAAM and 38.7 g BA were added into the flask together in 150 minutes. Then add 6 g ammonia (20 w.t. %) below 50° C., then add 64.2 g aqueous adipoyl dihydrazide solution (10 w.t. %) below 40° C., after the end of the feed the reaction mixture was cooled to room temperature. Tg of the obtained polymer is 14° C.

Formulate 56.8 g of the resulting latex with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

Comparative Example 1

Formulate 56.8 g of Joncryl 1980® (styrene-acrylate copolymer emulsion) with 40.2 g of demineralized water, 2.0 g Di(propylene glycol) methyl ether, 0.5 g Hydropalat® WE 3475, 0.5 g Foam Star® SI 2292 and the respective ink anchorage primer is obtained.

The adhesion test of the ink anchorage primer is conducted as follows: Printing the resulted ink anchorage primer on surface of BOPP by K-bar, then dry at 80° C. for 30 seconds, 24 hours later coating the ink TOKA® 161 Yellow from TOKA on the ink anchorage primer by offset printer, then fully dried by IGT® UV dryer, then use the 3M® 610 tape immediately to cohere the surface of ink and uncover the 3M® 610 tape after 30 seconds. The ink retention rate was tested according to the proportion of the residue ink on the surface of BOPP. The higher the ink retention rate is, the better results achieved.

Tg is determined by Differential Scanning Calorimetrie (TA DSC Q100, Waters TA, −80 to 120° C., "midpoint temperature" of second heating curve, heating rate 10° C./min) in this invention.

The adhesion test results are shown in the following Table 1.

TABLE 1

| Adhesion test results | | | | | | |
|---|---|---|---|---|---|---|
| | Example No. | | | | | |
| | Example 1 | Example 2 | Example 3 | Example 4 | Example 5 | Example 6 |
| Ink retention rate | 80% | 70% | 60% | 60% | 80% | 80% |
| | Example No. | | | | | |
| | Example 7 | Example 8 | Example 9 | Example 10 | Example 11 | Comparative Example 1 |
| Ink retention rate | 90% | 50% | 40% | 30% | 50% | 20% |

The data from Table 1 shows that comparing with the ink anchorage primer in the prior art, use the aqueous polymer dispersion of present invention could substantially enhance the ink bonding to substrate.

It will be apparent to those skilled in the art that various modifications and variations can be made in the present invention without departing from the scope or spirit of the invention. Thus, it is intended that the present invention cover such modifications and variations as come within the scope of the appended claims and their equivalents.

The invention claimed is:

1. An aqueous polymer dispersion comprising:
    A) a polymer synthesized from monomers comprising:
        a) 10 to 40% by weight, based on a total amount of monomers for the synthesis of polymer A), of at least one alkyl (meth)acrylate;
        b) 1 to 3% by weight, based on the total amount of monomers for the synthesis of polymer A), of at least one ethylenically unsaturated acid or vinyl monomer with latent ionic groups;
        c) 1 to 3% by weight, based on the total amount of monomers for the synthesis of polymer A), of at least one monoethylenically unsaturated monomer having at least one keto or aldehyde group;
        d) 50 to 84% by weight, based on the total amount of monomers for the synthesis of polymer A), of at least one vinyl ester of saturated aliphatic monocarboxylic acid in which the carboxyl groups are attached to tertiary and/or quaternary carbon atoms;
        e) 0 to 20% by weight, based on the total amount of monomers for the synthesis of polymer A), of at least one vinyl aromatics; and
        f) 0 to 20% by weight, based on the total amount of monomers for the synthesis of polymer A), of at least one hydroxyalkyl (meth)acrylate, and
    B) optionally, at least one compound that comprises at least two functional groups reactive to the keto or aldehyde group,
    wherein the Tg of polymer A) is from −13 to 10° C.

2. An aqueous polymer dispersion according to claim 1, wherein a) is selected from at least one $C_1$ to $C_{10}$ alkyl (meth)acrylate.

3. An aqueous polymer dispersion according to claim 1, wherein b) is selected from at least one of (meth)acrylic acid, maleic acid, fumaric acid, and itaconic acid.

4. An aqueous polymer dispersion according to claim 1, wherein c) is selected from at least one of acrolein, methacrolein, vinyl alkyl ketones having 1 to 20 carbon atoms in the alkyl radical, formylstyrene, and (meth)acrylic acid C3 to C10 alkyl esters having one or two keto or aldehyde or one aldehyde and one keto group in the alkyl radical.

5. An aqueous polymer dispersion according to claim 1, wherein d) is selected from at least one of vinyl neononanoate and vinyl neodecanoate.

6. An aqueous polymer dispersion according to claim 1, wherein a) is selected from at least one $C_1$ to $C_6$ alkyl (meth)acrylate, b) is acrylic acid and/or methacrylic acid, c) is diacetone acrylamide, and d) is vinyl neodecanoate.

7. An aqueous polymer dispersion according to claim 1, wherein the functional groups of B) are hydrazide, hydroxylamine, oxime ether, or amino groups.

8. An aqueous polymer dispersion according to claim 1, wherein the amount of B) is 0.5 to 5 parts by weight per 100 parts by weight of polymer A).

9. An aqueous polymer dispersion according to claim 1, wherein the polymer A) is synthesized by a single step reaction.

10. A process for the preparation of the aqueous polymer dispersion according to claim 1, the process comprising:
    1) free-radically polymerizing: monomers a), b) c), and d), optionally with monomers e) and/or f),
    in the presence of at least one initiator and at least one emulsifier to produce the polymer A; then
    2) optionally mixing the polymer A) with B) the at least one compound that comprises at least two functional groups reactive to the keto or aldehyde group.

11. A process for the preparation of the aqueous polymer dispersion according to claim 1, the process comprising:
    1) free-radically polymerizing: monomers a), b), c), and d), optionally with monomers e) and/or f),
    in the presence of at least one initiator and at least one emulsifier to produce the polymer A; then
    2) mixing the polymer A) with B) the at least one compound that comprises at least two functional groups reactive to the keto or aldehyde group.

12. An ink anchorage primer comprising the aqueous polymer dispersion according to claim 1, the ink anchorage primer comprising, based on the weight of the primer:
    1) 40 to 95% the aqueous polymer dispersion;
    2) 0.1 to 5% wetting agent;
    3) 0 to 10% coalescent agent;
    4) 0 to 5% defoamer; and
    5) 1.0 to 59% water.

13. An ink anchorage primer according to claim 12, wherein the solid content of the ink anchorage primer is 20 to 45 wt. %.

14. An ink anchorage primer according to claim 12, wherein at least part of the functional groups of B) has reacted with the keto or aldehyde group.

15. An ink anchorage primer according to claim 12, which is suitable for labels and package materials of cigarette, liquor, food, and cosmetic.

* * * * *